C. DAVIS.
AUTOMOBILE HEADLIGHT.
APPLICATION FILED MAY 14, 1920.

1,360,899.

Patented Nov. 30, 1920.

Claude Davis INVENTOR
BY Victor J. Evans ATTORNEY

R. A. Thomas

WITNESSES

UNITED STATES PATENT OFFICE.

CLAUDE DAVIS, OF WASHINGTON, DISTRICT OF COLUMBIA.

AUTOMOBILE-HEADLIGHT.

1,360,899.  Specification of Letters Patent.  Patented Nov. 30, 1920.

Application filed May 14, 1920. Serial No. 381,406.

*To all whom it may concern:*

Be it known that I, CLAUDE DAVIS, a citizen of the United States, residing at Washington, in the District of Columbia, have invented new and useful Improvements in Automobile-Headlights, of which the following is a specification.

This invention relates to dirigible headlights for automobiles, trucks and the like and the principal object of the invention is to provide means whereby the left hand light will be caused to follow the road when a right hand turn is made, the right hand lamp being held stationary, the right hand lamp following the road when a left hand turn is made and the left hand lamp being held stationary, thus lighting up all parts of the road when the turn is being made.

Another object of the invention is to provide means for turning the lamps by the steering mechanism of the automobile.

Still another object of the invention is to provide means for adjusting the lamps when in a normal position.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1:
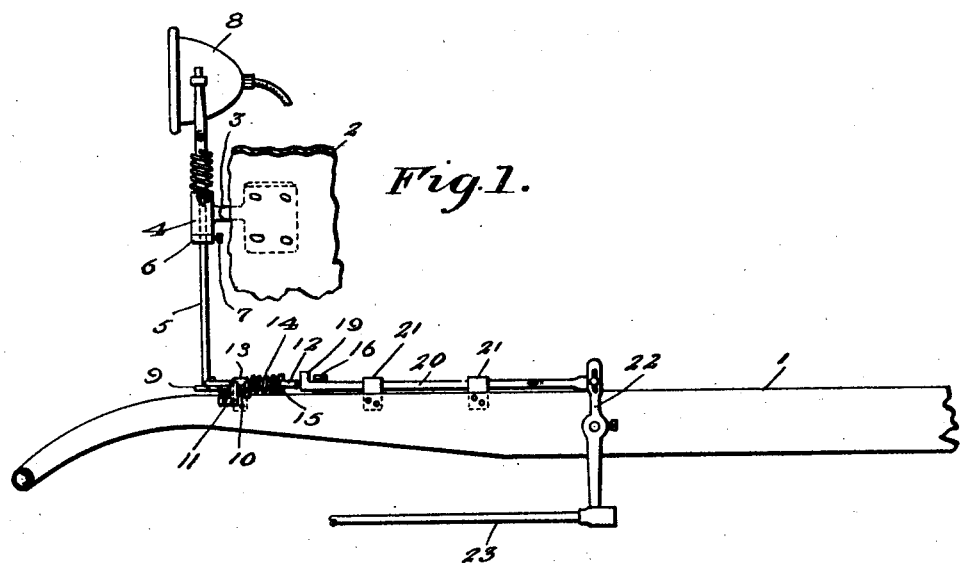
Figure 1 is a fragmentary side view showing one manner of carrying out my invention.
Figure 2:
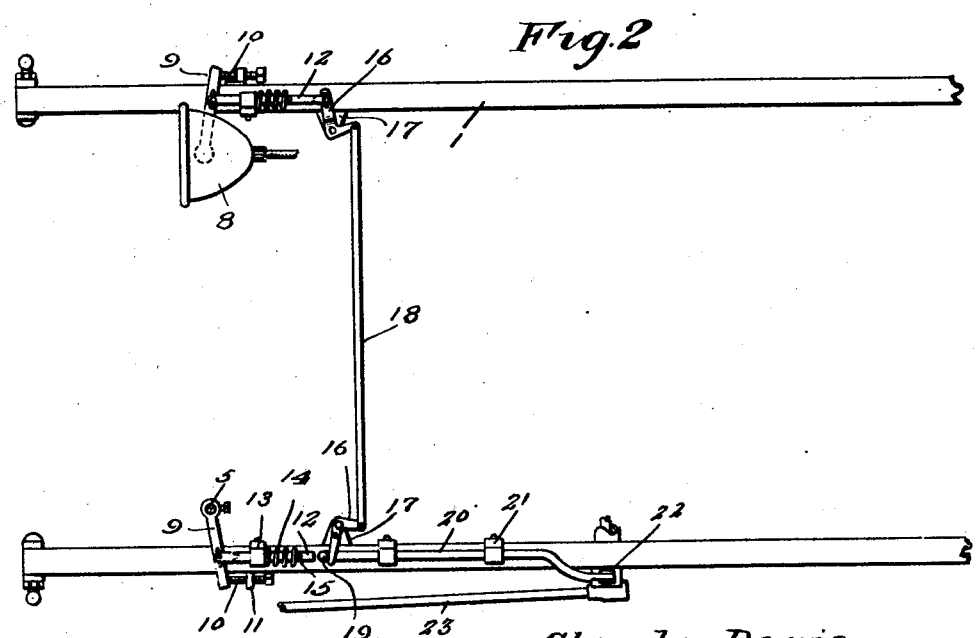
Fig. 2 is a fragmentary plan view of Fig. 1.

In these views 1 indicates a part of the chassis of the automobile and 2 a part of the body to which the lamp supporting brackets 3 are connected. These brackets carry the sleeve 4 through which the lamp standards 5 pass, each standard having an enlarged part for engaging the upper end of the sleeve and a collar 6, held to the standard by the bolt 7 which engages the bottom of the sleeve. This arrangement of parts prevents vertical movement of the standard and the sleeve while permitting rotary movement thereof. The lamp standards are forked at their upper ends, as usual, to receive the lamps 8. The lower end of each standard has secured thereto an arm 9 and the outer end of this arm engages a set screw 10 which is carried by a lug 11 projecting from the side of the frame. By means of this set screw the normal position of the standard and the lamp carried thereby may be adjusted. This set screw also acts as a stop for limiting the turning movement of the lamp and standard. A rod 12 is connected to each of the arms 9 by a bolt and slot connection and each rod passes through a bracket 13 carried by the frame and a spring 14 is carried by the rod 12 and has one end bearing against the bracket 13 and its other end against a pin 15 carried by the rod. This spring tends to hold the arm 9 against the end of the set screw 10. A bell crank lever 16 is pivoted on a bracket 17, secured to the inner face of each of the side bars of the frame and these levers are connected together by the cross rod 18. The right hand bell crank lever is connected with the rod 12 for the right hand lever, while the other bell crank lever engages the bent up end 19 of a longitudinally movable rod 20 which is slidably supported by the brackets 21 carried by the left hand side bar of the frame. This end 19 is adapted to engage the end of the left hand rod 12 when said rod 20 is moved forwardly. The rear end of this rod is offset and is connected by a pin and slot connection with the lever 22 which forms part of the steering mechanism, this lever being connected with the steering rod 23.

It will thus be seen that when the steering mechanism is turned to turn the car to the right the rod 20 will be moved forwardly so that its forward end will strike the rod 12, pushing the same forwardly against the action of its spring and thus rotating the left hand lamp standard and lamp and causing said lamp to send its rays of light in the same direction that the car is turning. While this is taking place the right hand lamp remains stationary. As soon as the turn is made the spring 14 will return the left hand lamp to its normal position. When a left hand turn is made the rod 20 is moved rearwardly so that its bent end will engage the bell crank lever on the left hand side bar of the frame, causing the bar 18 to rock the other bell crank lever which is connected with the bar 12 of the right hand lamp, thus moving said lamp to cause it to cast its rays of light to the left. When this action is taking place the left hand lamp remains stationary. Thus when the car is making a turn one lamp will remain stationary while the other lamp will turn with the car so that all parts of the road are illuminated.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In combination with an automobile and its headlights, arms connected with the standards of the headlights, a rod slidably connected with the frame and engaging each arm, spring means for holding the parts in normal position, a longitudinally movable rod mounted on the frame and connected with the steering mechanism and having one end adapted to engage one of the bars for moving the left hand lamp when the steering mechanism is manipulated to make a right hand turn and means actuated by said longitudinally movable rod for turning the right hand lamp when the steering mechanism is manipulated to make a left hand turn.

2. In combination with an automobile and its headlights, means for rotatably supporting the standards of the headlights, arms connected with said standards, a slidably mounted rod connected with each arm, springs on the rods for holding the parts in normal position, a pair of bell cranks, one of which is connected with one rod, a rod connecting the bell cranks together, a longitudinally movable rod, having its forward end bent upwardly to engage one bell crank and the slidable rod of the left hand lamp and means for connecting said rod with the steering mechanism so that in one movement of the mechanism the bent end of the rod will engage the sliding rod of the left hand lamp to turn said lamp and in the opposite movement of the steering mechanism said bent end will engage the bell crank lever to cause the parts to turn the right hand lamp.

In testimony whereof I affix my signature.

CLAUDE DAVIS.